United States Patent [19]

Kutter et al.

[11] 3,829,574
[45] Aug. 13, 1974

[54] HYPOGLYCEMIC PHARMACEUTICAL COMPOSITIONS AND METHODS OF USE

[75] Inventors: Eberhard Kutter; Gerhart Griss; Wolfgang Grell; Manfred Kleemann, all of Biberach/Riss, Germany

[73] Assignee: Boehringer Ingelheim GmbH, Ingelheim/Rhine, Germany

[22] Filed: Oct. 6, 1972

[21] Appl. No.: 298,801

Related U.S. Application Data

[62] Division of Ser. No. 26,072, April 6, 1970, Pat. No. 3,708,486.

[30] Foreign Application Priority Data

Apr. 17, 1969 Germany.............................. 1919570
Jan. 5, 1970 Germany.............................. 2000339

[52] U.S. Cl. ................................................. 424/258
[51] Int. Cl. ............................................. A61k 27/00
[58] Field of Search....................... 260/72; 424/258

[56] References Cited
UNITED STATES PATENTS

| | | | |
|---|---|---|---|
| 2,842,450 | 7/1958 | Sasse................................... | 260/281 |
| 3,449,346 | 6/1969 | Aumullen ............................ | 260/281 |
| 3,708,486 | 1/1973 | Kutter et al.......................... | 424/258 |

FOREIGN PATENTS OR APPLICATIONS 1,919,570  11/1970  Germany
2,000,339   7/1971  Germany Primary Examiner—Albert T. Meyers
Assistant Examiner—Leonard Schenkman
Attorney, Agent, or Firm—Hammond & Littell

[57] ABSTRACT

Hypoglycemic pharmaceutical compositions containing a 2-[p-(N'-cycloalkyl-carbamido-N-sulfonyl)-phenethyl]-1,2,3,4-tetrahydro-1,3-dioxo-4,4-dimethyl-isoquinoline of the formula

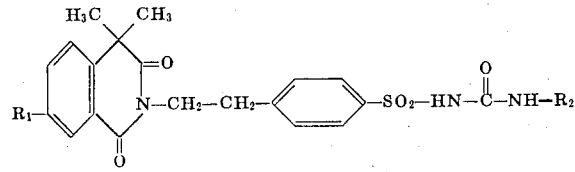

wherein
$R_1$ is hydrogen, chlorine, bromine or alkoxy of one to four carbon atoms, and
$R_2$ is cyclohexyl or adamantyl-(1), or an alkali metal salt thereof; and a method of lowering the blood sugar level therewith.

2 Claims, No Drawings

HYPOGLYCEMIC PHARMACEUTICAL COMPOSITIONS AND METHODS OF USE

This is a division of copending application Ser. No. 26,072, filed Apr. 6, 1970 now U.S. Pat. No. 3,708,486.

This invention relates to novel hypoglycemic pharmaceutical compositions containing as an active ingredient a 2-[p-(N'-cycloalkyl-carbamido-N-sulfonyl)-phenethyl]-1,2,3,4-tetrahydro-1,3-dioxo-4,4-dimethyl-isoquinoline or an alkali metal salt thereof, and to a method of lowering the blood sugar level therewith.

More particularly, the present invention relates to novel pharmaceutical compositions containing as an active ingredient a compound of the formula

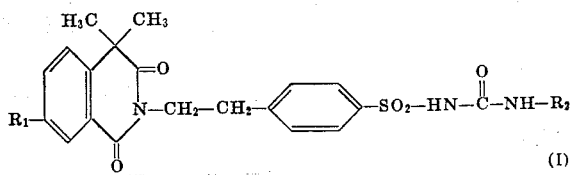

wherein
R₁ is hydrogen, chlorine, bromine or alkoxy of one to four carbon atoms, and
R₂ is cyclohexyl or adamantyl-(1),
or an alkali metal salt thereof.

The compounds of the formula I are prepared by reacting a sulfonamide of the formula

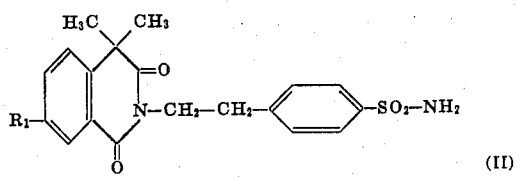

wherein R₁ has the same meanings as in formula I, or an alkali metal salt thereof, with an isocyanate of the formula

wherein R₂ has the same meanings as in formula I.

More specifically, the reaction is preferably carried out by first dissolving a sulfonamide of the formula II in an inert organic solvent, preferably in a dipolar aprotic solvent such as dimethylformamide, acetone or N-methyl-pyrrolidone; then converting the dissolved sulfonamide into an alkali metal salt thereof by adding to the solution a strong anhydrous base, for example, an alkali metal hydride, an alkali metal hydroxide or an alkali metal alcoholate, such as potassium tert.-butylate; subsequently, while cooling, adding to the sulfonamide salt solution an isocyanate of the formula III; allowing the reaction to go to completion at a temperature ranging from relatively low to moderately elevated temperatures, but preferably between −5°C and room temperature; and isolating the reaction product of the formula I from the reaction mixture by conventional procedures.

If desired, a compound of the formula I obtained in this way may be converted into an alkali metal salt thereof by treating a solution of compound I in an inert solvent with an alkali metal ethylate.

The sulfonamide starting compounds of the formula II wherein R₁ is hydrogen, chlorine or bromine are prepared by subjecting a benzenesulfonamide of the formula

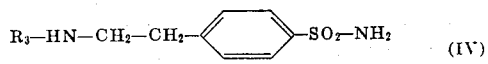

wherein R₃ is hydrogen or acetyl, to a condensation reaction with homophthalic acid, with a homophthalic acid derivative comprising activated carboxyl functions, or with a 4-halohomophthalic acid, and then methylating the condensation product with a methyl halide in the presence of a strong base, such as sodium hydroxide or sodium ethylate. The condensation reaction may be carried out by heating a mixture of the reactants to the melting point, or also by heating a solution of the reactants in an inert organic solvent to a temperature between 150° and 200°C.

On the other hand, a sulfonamide of the formula II, wherein R₁ is alkoxy of one to four carbon atoms, is prepared by subjecting 4-aminosulfonylphenyl-(2)-ethylamine of the formula

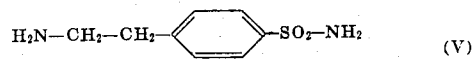

to a condensation-reaction with a 1,2,3,4-tetrahydro-4,4-dimethyl-7-alkoxy-isochromane-dione-(1,3) of the formula

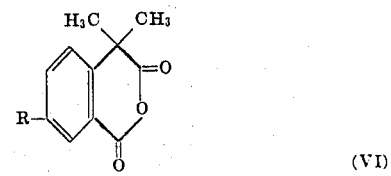

wherein R is alkoxy of one to four carbon atoms, in the presence of an inert organic solvent, such as xylene, and at the boiling point of the solvent in an apparatus provided with a water separator.

An isochromane derivative of the formula VI is, in turn, prepared by alkylation of 1,2,3,4-tetrahydro-2,4,4-trimethyl-7-hydroxy-isoquinoline-dione-(1,3) of the formula

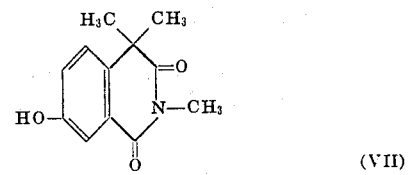

heating the alkylation product with aqueous sodium hydroxide under reflux, and acidifying the reaction solution.

The 1,2,3,4-tetrahydro-2,4,4-trimethyl-7-hydroxy-isoquinoline-dione-(1,3) of the formula VII is itself prepared by nitrating 1,2,3,4-tetrahydro-2,4,4-trimethyl-isoquinoline-dione-(1,3), catalytic reduction of the nitro group, diazotization and hydrolysis of the diazonium compound under reflux.

The isocyanates of the formula III are described in the literature and may, for example, be prepared from the corresponding amines and phosgene.

The following examples illustrate the preparation of various compounds of the formula I.

EXAMPLE 1

Preparation of 2-[p-(N'-cyclohexyl-carbamido-N-sulfonyl)-phenethyl]-1,2,3,4-tetrahydro-4,4-dimethyl-7-methoxy-isoquinoline-dione-(1,3)

(a) A mixture consisting of 4 gm of 1,2,3,4-tetrahydro-4,4-dimethyl-7-methoxy-isochromane-dione-(1,3) (m.p. 95° – 97°C), 2.53 gm of 4-aminosulfonyl-phenyl-(2)-ethylamine and 150 ml of xylene was heated for two hours at its boiling point in an apparatus provided with a water separator. Thereafter, the reaction mixture was allowed to cool and was then vacuum-filtered, and the filter cake was recrystallized from n-propanol in the presence of activated charcoal. 2.9 gm (58 percent of theory) of 1,2,3,4-tetrahydro-4,4-dimethyl-2-[p-aminosulfonylphenyl-(2)-ethyl]-7-methoxy-isoquinoline-dione-(1,3), m.p. 203°–205°C, of the formula

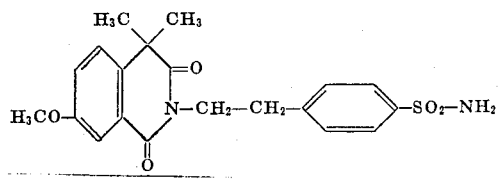

were obtained.

(b) 32.2 gm of 1,2,3,4-tetrahydro-4,4-dimethyl-2-[p-aminosulfonylphenyl-(2)-ethyl]-7-methoxy-isoquinoline-dione-(1,3) were dissolved in 700 ml of dimethylformamide, 9.1 gm of potassium tert.-butylate were added to the solution, and, while cooling the mixture with ice, 14.9 gm of cyclohexyl isocyanate were added dropwise thereto. Subsequently, the reaction mixture was stirred for 5 hours on an ice bath and was then allowed to stand overnight at −2°C. Thereafter, the reaction solution was admixed with water, the precipitate formed thereby was separated by vacuum-filtration, the filtrate was admixed with more water, and the aqueous solution was acidified with 2 N hydrochloric acid. A greasy substance precipitated out which crystallized after a brief period of contact with boiling methanol. 2.6 gm (86 percent of theory) of 1,2,3,4-tetrahydro-2-[p-(N'-cyclohexyl-ureido-N-sulfonyl)-phenethyl]-4,4-dimethyl-7-methoxy-isoquinoline-dione-(1,3), m.p. 180°–182°C, of the formula

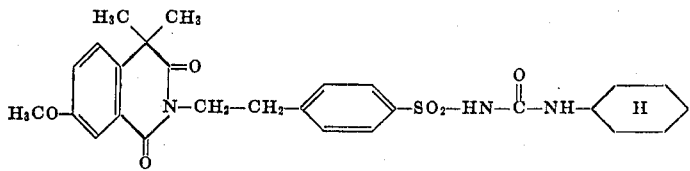

were obtained.

(c) 10.5 gm of 1,2,3,4-tetrahydro-2-[p-(N'-cyclohexyl-ureido-N-sulfonyl)-phenethyl]-4,4-dimethyl-7-methoxy-isoquinoline-dione-(1,3) were dissolved in 500 ml of acetone, the solution was cooled to between −5° and 0°C, and a solution of the stoichiometric amount of sodium ethylate in 20 ml of ethanol was slowly added dropwise. 10.1 gm (91 percent of theory) of the sodium salt of 1,2,3,4-tetrahydro-2-[p-(N'-cyclohexyl-ureido-N-sulfonyl)-phenethyl]-4,4-dimethyl-7-methoxy-isoquinoline-dione-(1,3) were obtained as a colorless crystalline substance which sintered beginning at 160°C.

EXAMPLE 2

Using a procedure analogous to that described in Example 1(b), 1,2,3,4-tetrahydro-2-[p-(N'-adamantyl-(1)-ureido-N-sulfonyl)-phenethyl]-4,4-dimethyl-7-methoxy-isoquinoline-dione-(1,3) of the formula

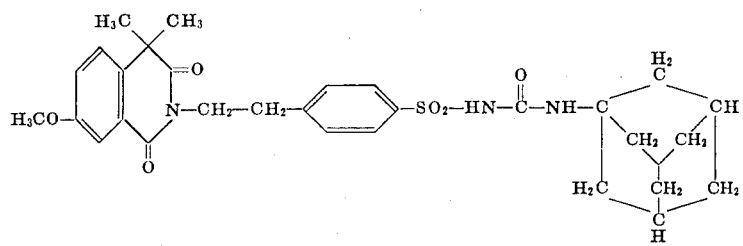

was prepared from 1,2,3,4-tetrahydro-2-[p-(amino-sulfonyl)-phenethyl]-4,4-dimethyl-7-methoxy-isoquinoline-dione-(1,3) and adamantayl-(1)-isocyanate. Its sodium salt had a melting point of 235°–238°C.

EXAMPLE 3

Using a procedure analogous to that described in Example 1(b), 1,2,3,4-tetrahydro-2-[p-(N'-cyclohexyl-ureido-N-sulfonyl)-phenethyl]-4,4-dimethyl-7ethoxy-isoquinoline-dione-(1,3), m.p. 90°C, of the formula

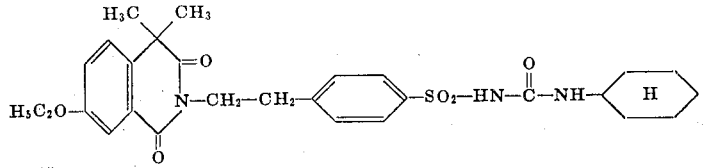

was prepared from 1,2,3,4-tetrahydro-2-[p-(amino-sulfonyl)-phenethyl]-4,4-dimethyl-7-ethoxy-isoquinoline-dione-(1,3), m.p. 149°C, and cyclohexyl-isocyanate. Its sodium salt had a melting point of 175°C.

The 1,2,3,4-tetrahydro-2-[p-(amino-sulfonyl)-phenethyl]-4,4-dimethyl-7-ethoxy-isoquinoline-dione-(1,3) of the formula

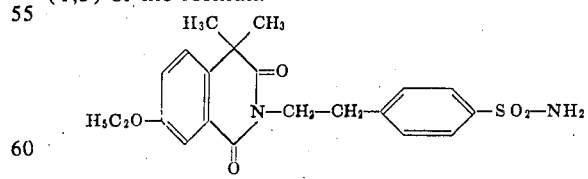

was itself prepared from 1,2,3,4-tetrahydro-4,4-dimethyl-7-ethoxy-isochromane-dione-(1,3) and p- aminosulfonyl-phenethyl-amine analogous to Example 1(a).

EXAMPLE 4

Using a procedure analogous to that described in Example 1(b), 1,2,3,4-tetrahydro-2-[p-(N'-adamantyl-(1)-ureido-N-sulfonyl)-phenethyl]-4,4-dimethyl-7-ethoxy-isoquinoline-dione-(1,3), m.p. 107°C, was prepared from 1,2,3,4-tetrahydro-2-[p-(aminosulfonyl)-phenethyl]-4,4-dimethyl-7-ethoxy-isoquinoline-dione-(1,3) and adamantyl-(1)-isocyanate. Its sodium salt had a melting point of 225°C.

EXAMPLE 5

Using a procedure analogous to that described in Example 1(b), 1,2,3,4-tetrahydro-2-[p-(N'-cyclohexyl-ureido-N-sulfonyl)-phenethyl]14,4-dimethyl-7-isopropoxy-isoquinoline-dione-(1,3), m.p. 124°C, of the formula

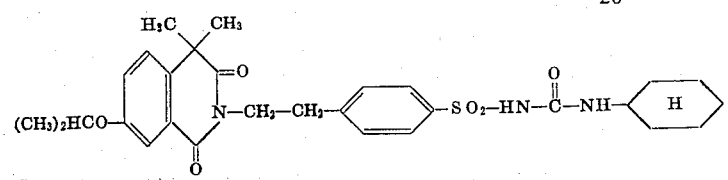

was prepared from 1,2,3,4-tetrahydro-2-[p-aminosulfonyl)-phenethyl]-4,4-dimethyl-7-isopropoxy-isoquinoline-dione-(1,3), m.p. 154°C, and cyclohexyl-isocyanate. Its sodium salt had a melting point of 183°C.

The 1,2,3,4-tetrahydro-2-[p-(amino-sulfonyl)-phenethyl]-4,4-dimethyl-7-isopropoxy-isoquinoline-dione-(1,3) of the formula

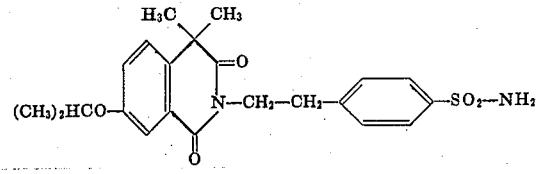

was itself prepared from 1,2,3,4-tetrahydro-4,4-dimethyl-7-isopropoxy-isochromane-dione-(1,3) and p-(amino-sulfonyl-phenethylamine analogous to Example 1(a).

EXAMPLE 6

Using a procedure analogous to that described in Example 1(b), 1,2,3,4-tetrahydro-2-[p-(N'-cyclohexyl-ureido-N-sulfonyl)-phenethyl]-4,4-dimethyl-7-n-butoxy-isoquinoline-dione-(1,3), m.p. 95°C, of the formula

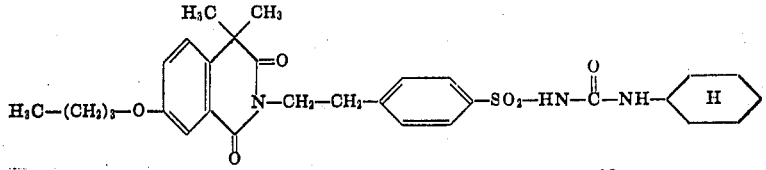

was prepared from 1,2,3,4-tetrahydro-2-[p-(amino-sulfonyl)-phenethyl]-4,4-dimethyl-7-n-butoxy-isoquinoline-dione-(1,3), m.p. 107°C, cyclohexyl-isocyanate. Its sodium salt had a melting point of 225°C.

The 1,2,3,4-tetrahydro-2-[p-(amino-sulfonyl)-phenethyl]-4,4-dimethyl-7-n-butoxy-isoquinoline-dione-(1,3) of the formula

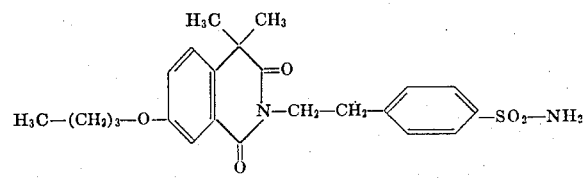

was itself prepared from 1,2,3,4-tetrahydro-4,4-dimethyl-7-n-butoxy-isochromane-dione-(1,3) and p-(amino-sulfonyl)-phenethylamine analogous to Example 1(a).

EXAMPLE 7

Preparation of 1,2,3,4-tetrahydro-2-[p-(N'-cyclohexyl-ureido-N-sulfonyl)-phenethyl]-4,4-dimethyl-isoquinoline-dione-(1,3)

(a) A mixture consisting of 26.7 gm of 1,2,3,4-tetrahydro-2-[p-(amino-sulfonyl)-phenethyl]-isoquioline-dione-(1,3), m.p. 246°C, 170ml of ethanol, 30 ml of water and 22 gm of methyl iodide was heated to its boiling point and simultaneously a solution of 155 millimols of sodium ethylate in 70 ml of ethanol was added dropwise thereto. After all of the sodium ethylate solution had been added, the reaction mixture was boiled for 2 to 4 hours more. Thereafter, the solvent medium was distilled off, the residue was admixed with ice water, and the insoluble raw product was collected and recrystallized from chlorobenzene. 22.7 gm (78.5 percent of theory) of 1,2,3,4-tetrahydro-4,4-dimethyl-2-[p-(amino-sulfonyl)-phenethyl]-isoquinoline-dione-(1,3), m.p. 213°–214°C, of the formula

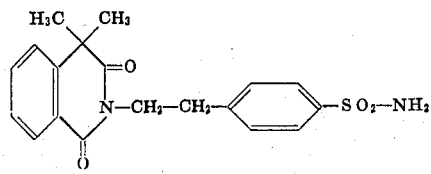

were obtained.

(b) 5 gm of 1,2,3,4-tetrahydro-4,4-dimethyl-2[p-(amino-sulfonyl)-phenethyl]-isoquinoline-dione-(1,3) were dissolved in 28 ml of dimethylformamide and converted into the sodium salt with a 50 percent oil suspension of 0.64 gm of sodium hydride. After everything had gone into solution, 1.83 gm of cyclohexylisocyanate were added at 5°C, and the mixture was stirred for 1 to 2 hours at room temperature to allow the reaction to go to completion. Thereafter, the reaction mixture was admixed with 100 ml of water, and the resulting aqueous solution was acidified with glacial acetic acid. The precipitate formed thereby was collected and recrystallized from methanol, yielding 2.6 gm (39.1 percent of theory) of 1,2,3,4-tetrahydro-2-[p-(N'-cyclohexyl-ureido-N-sulfonyl)-phenethyl]-4,4-dimethyl-isoquinoline-dione-(1,3), m.p. 179°–181°C, of the formula

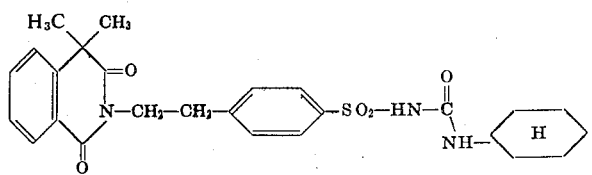

Its sodium salt began to decompose at 205°C.

EXAMPLE 8

Using a procedure analogous to that described in Example 7(b), 1,2,3,4-tetrahydro-2-[p-(N'-adamantyl-1)-ureido-N-sulfonyl)-phenethyl]-4,4-dimethyl-7-bromo-isoquinoline-dione-(1,3), m.p. 119°C (from methanol), of the formula

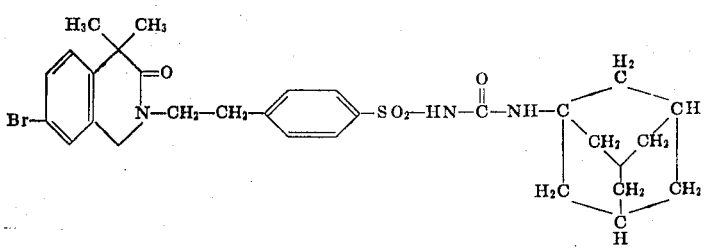

was prepared from 1,2,3,4-tetrahydro-2-[p-(amino-sulfonyl-phenethyl]-4,4-dimethyl-7-bromo-isoquinoline-dione-(1,3), m.p. 186°C, and adamantyl-(1)-isocyanate. The yield was 14.4 percent of theory. Its sodium salt had a melting point of 226°C (decomp.).

The 1,2,3,4-tetrahydro-2-[p-(amino-sulfonyl)-phenethyl]-4,4-dimethyl-7-bromo-isoquinoline-dione-(1,3) of the formula

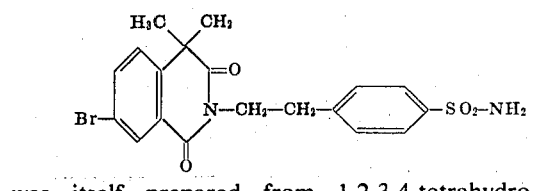

was itself prepared from 1,2,3,4-tetrahydro-2-[p-(amino-sulfonyl)-phenethyl]-isoquinoline-dione-(1,3), m.p. 238°C, and methyl iodide analogous to Example 7(a).

EXAMPLE 9

Using a procedure analogous to that described in Example 7(b), 1,2,3,4-tetrahydro-2-[p-(N'-cyclohexyl-ureido-N-sulfonyl)-phenethyl]-4,4-dimethyl-7-chloro-isoquinoline-dione-(1,3), m.p. 177°C (from methanol), of the formula

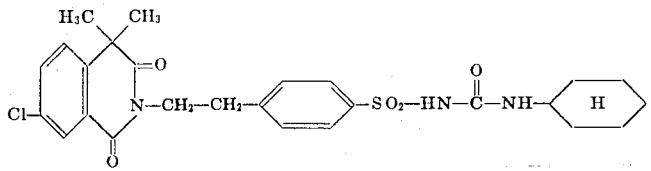

was prepared from 1,2,3,4-tetrahydro-2-[p-amino-sulfonyl-phenethyl]-4,4-dimethyl-7-chloro-isoquinoline-dione-(1,3), m.p. 193°C, and cyclohexyl-isocyanate. The yield was 40 percent of theory.

The 1,2,3,4-tetrahydro-2-[p-(amino-sulfonyl)-phenethyl]-4,4-dimethyl-7-chloro-isoquinoline-dione-(1,3) of the formula

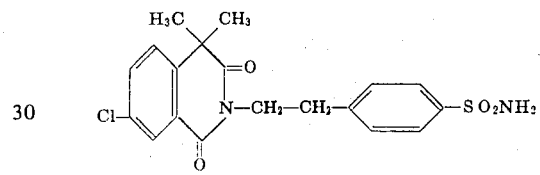

was itself prepared from 1,2,3,4-tetrahydro-2-[p-(amino-sulfonyl)-phenethyl]-isoquinoline-dione-(1,3), m.p. 252°C, and methyl iodide analogous to Example 7(a).

EXAMPLE 10

Using a procedure analogous to that described in Example 7(b), 1,2,3,4-tetrahydro-2-[p-(N'-adamantyl-(1)-ureido-N-sulfonyl)phenethyl]-4,4-dimethyl-isoquinoline-dione-(1,3), m.p. 199°C (from methanol), was prepared from 1,2,3,4-tetrahydro-2-[p-(amino-sulfonyl-phenethyl]-4,4-dimethyl-isoquinoline-dione-(1,3) and adamantyl-(1)-isocyanate. The yield was 10.4 percent of theory. Its sodium salt had a melting point of 232°–235°C (decomp.).

EXAMPLE 11

Using a procedure analogous to that described in Example 7(b), 1,2,3,4-tetrahydro-2-[p-(N'-adamantyl-(1)-ureido-N-sulfonyl)-phenethyl]-4,4-dimethyl-7-chloro-isoquinoline-dione-(1,3), m.p. 184°C (from ethanol), was prepared from 1,2,3,4-tetrahydro-2-[p-(amino-sulfonyl)-phenethyl]-4,4-dimethyl-7-chloro-isoquinoline-dione-(1,3) and adamantyl-(1)-isocyanate. The yield was 10 percent of theory.

EXAMPLE 12

Using a procedure analogous to that described in Example 7(b), 1,2,3,4-tetrahydro-2[p -(N'-cyclohexyl-ureido-N-sulfonyl)-phenethyl]-4,4-dimethyl-7-bromo-isoquinoline-dione-(1,3), m.p. 179°C (from ethanol), was prepared from 1,2,3,4-tetrahydro-2-[p-(amino-sulfonyl)-phenethyl]-4,4-dimethyl-7-bromo-isoquinoline-dione-(1,3) and cyclohexyl-isocyanate. The yield was 50 percent of theory.

The compounds embraced by formula I above and their alkali metal salts have useful pharmacodynamic properties. More particularly, they exhibit very effective hypoglycemic activities at low dosage levels and low toxicity in warm-blooded animals, as evidenced by the following pharmacological test results.

The following compounds of the formula I were tested for hypoglycemic activity and acute toxicity:

A. 1,2,3,4-Tetrahydro-2-[p-(N'-cyclohexyl-ureido-N-sulfonyl-phenethyl]-4,4-dimethyl-isoquinoline-dione-(1,3);

B. 1,2,3,4-Tetrahydro-2-[p-('-cyclohexyl-ureido-N-sulfonyl)-phenethyl]-4,4-dimethyl-7-chloro-isoquinoline-dione-(1,3);

C. 1,2,3,4-Tetrahydro-2-[p-(N'-cyclohexyl-ureido-N-sulfonyl)-phenethyl]-4,4-dimethyl-7-bromo-isoquinoline-dione-(1,3);

D. 1,2,3,4-Tetrahydro-2-[p-(N'-adamantyl-(1)-ureido-N-sulfonyl)-phenethyl]]-4,4-dimethyl-isoquinoline- dione-(1,3);

E. 1,2,3,4-Tetrahydro-2-[p-(N'-adamantyl-(1-ureido-N-sulfonyl)-phenethyl]-4,4-dimethyl-7-chloro-isoquinoline-dione-(1,3);

F. 1,2,3,4-Tetrahydro-2-[p-(N'-adamantyl-(1)-ureido-N-sulfonyl)-phenethyl]-4,4-dimethyl-7-bromo-isoquinoline-dione-(1,3); and G. 1,2,3,4-Tetrahydro-2-[p-(N'-cyclohexyl-ureido-N-sulfonyl)-phenethyl]-4,4-dimethyl-7methoxy-isoquinoline-dione-(1,3).

1. Hypoglycemic Activity

The minimum effective hypoglycemic peroral dose of the compounds and the hypoglycemic effect produced thereby over the normal blood sugar content (in mgm %) were determined on adult male laboratory rats having an average body weight of 180 gm; the test animals received a normal diet. Each compound under investigation, in the form of its sodium salt, was suspended in aqueous methyl cellulose, the suspension was administered to the test animals perorally by means of an esophageal sound, and a blood sample of 20 microliters was taken from the tail at hourly intervals. Each compound was tested at varying dosage levels on a statistically significant number of animals.

The glucose content of each blood sample was determined by means of an automatic Technicon-Auto Analyzer [see U. Harding and G. Heinzel, Zeitschrift fur Klinische Chemie and Klinische Biochemie 7, No. 6 (1969)] according to the hexokinase method, i.e. phosphorylation of the glucose with ATP (adenosine triphosphate) into glucose-6-phosphate, followed by reduction with glucose-6-phosphate dehydrogenase into gluconate-6-phosphate, and photometrically measuring at 334 nm the amount of NADPH$_2$ simultaneously formed from NADP (nitonamide-adenine dinucleotide phosphate). The following table shows the results obtained.

TABLE 1

| Compound | Minimum effective hypoglycemic dose mgm/kg p.o. | Reduction of blood sugar content over normal mgm % |
|---|---|---|
| A | 0.62 | 14 |
| B | 0.62 | 12 |
| C | 0.31 | 8 |
| D | 0.31 | 9 |
| E | 0.62 | 20 |
| F | 0.31 | 11 |
| G | 0.20 | 10 |

The sodium salts of compounds A – G produced no significant changes in the blood pressure at dosages of 8 and 16 mgm/kg i.v. in anesthetized rats.

2. Acute toxicity (a) The acute intravenous toxicity of the sodium salts of compounds A, D, E, F and G was determined in adult white laboratory mice (body weight 18–25 gm). Each of the compounds under investigation was tested at no less than four dosage levels on 10 animals per dose. For this purpose, the calculated amount of each of the sodium salts was dissolved in 0.01 N sodium hydroxide, and then 0.2 ml/10 gm body weight of the solution was injected into the tail vein of the animal within 30 seconds. The animals were observed for seven days, and the number of animals which died during that period was recored. From this raw data, the median intravenous lethal dose (LD$_{50}$ i.v.), i.e. the dose which causes death in 50 percent of the animals within 7 days, was calculated by the standard statistical method according to Behrens-Karber.

(b) The median peroral lethal dose (LD$_{50}$ p.o.) was determined and calculated in analogous manner for the sodium salts of compounds A – G and for the free acid form of compounds A, C, D, F and G. For this purpose, each of the respective compounds was first milled to a particle size of 10 μ, the milled substance was homogeneously suspended in aqueous 1 percent methyl cellulose, and 2 ml/25 gm body weight of the suspension comprising the dose to be tested were administered by means of an esophageal sound. The following table shows the results obtained:

TABLE II

| Compound | Acute toxicity of the Sodium salts | | Free acids |
|---|---|---|---|
| | LD$_{50}$ p.o. gm/kg | LD$_{50}$ i.v. mgm/kg | LD$_{50}$ p.o. gm/kg |
| A | >2.0 | 234 | >15 |
| B | ~2.0 | | |
| C | >2.0 | | >15 |
| D | >2.5 | 260 | >15 |
| E | >2.5 | 210 | |
| F | >2.5 | 191 | >15 |
| G | 1.5 | 300 | >15 |

For pharmaceutical purposes the compounds of the formula I or their alkali metal salts are administered to warm-blooded animals, preferably perorally, as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups and the like. One effective hypoglycemic dosage unit of the compounds of the formula I and their alkali metal salts is from 0.0166 to 0.167 mgm/kg body weight, preferably 0.0416 to 0.084 mgm/kg body weight.

THe following examples illustrate pharmaceutical compositions containing a compound of the formula I as an active ingredient and represent the best mode contemplated of putting the invention into practical use. The parts are parts by weight unless otherwise specified.

EXAMPLE 13

Tablets

The tablet composition was compounded from the following ingredients:

|  | parts |
|---|---|
| 1,2,3,4-Tetrahydro-2-[p-(N'-cyclohexyl-ureido-N-sulfonyl)-phenethyl]-4,4-dimethyl-7-methoxy-isoquinoline-dione-(1,3) | 2.5 |
| Lactose | 87.5 |
| Corn starch | 26.0 |
| Polyvinylpyrrolidone | 3.0 |
| Magnesium stearate | 1.0 |
| Total | 120.0 |

Compounding procedure

The tetrahydro-isoquinoline-dione compound was intimately admixed with the lactose and the corn starch, the mixture was uniformly moistened with an ethanolic 12.5 percent solution of the polyvinylpyrrolidone, the moist was forced through a 1.5 mm-mesh screen, the resulting granulate was dried at 45°C and again passed through a 1.0 mm-mesh screen, the dry granulate was admixed with the magnesium stearate, and the composition was compressed into 120 mgm-tablets. Each tablet contained 2.5 mgm of the tetrahydro-isoquinoline-dione compound and, when administered perorally to a warm-blooded animal of about 60 kg body weight in need of such treatment, produced very good hypoglycemic effects.

EXAMPLE 14

Gelatin capsules

The capsule filler composition was compounded from the following ingredients:

|  | parts |
|---|---|
| 1,2,3,4-Tetrahydro-2-[p-(N'-cyclohexyl-ureido-N-sulfonyl)-phenethyl]-4,4-dimethyl-7-methoxy-isoquinoline-dione-(1,3) | 2.5 |
| Corn starch, dry | 97.5 |
| Total | 100.0 |

Compounding procedure

The ingredients were intimately admixed with each other, the mixture was passed through a 0.75 mm-mesh screen, and 100 mgm-portions of the screened composition were filled into individual hard gelatin capsules of suitable size. Each capsule contained 2.5 mgm of the tetrahydro-isoquinoline-dione compound, and, when administered perorally to a warm-blooded animal of about 60 kg body weight in need of such treatment, produced very good hypoglycemic effects.

Analogous results were obtained when an equal amount of any other compound of the formula I or a salt thereof was substituted for the particular tetrahydro-isoquinoline-dione compound in illustrative Examples 13 and 14. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to those skilled in the art that various changes and modifications may be made without departing from the spirit of the invention or the scope of the appended claims.

We claim:

1. A pharmaceutical dosage unit composition consisting essentially of an inert pharmaceutical carrier and an effective hypoglycemic amount of a compound of the formula

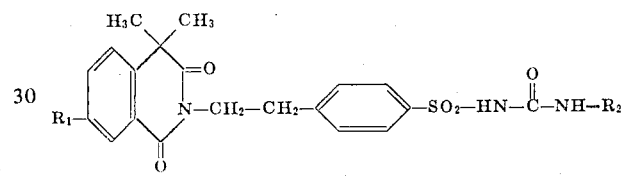

wherein
  $R_1$ is hydrogen, chlorine, bromine or alkoxy of one to four carbon atoms, and
  $R_2$ is cyclohexyl or adamantyl-(1),
or an alkali metal salt thereof.

2. The method of lowering the blood sugar level of a warm-blooded animal in need thereof which comprises perorally administering to said animal an effective hypoglycemic amount of a compound of the formula

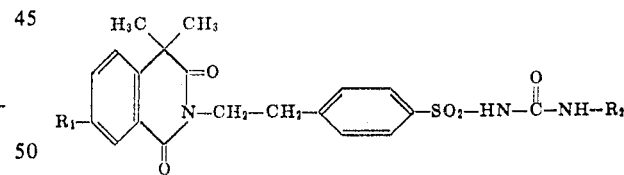

wherein
  $R_1$ is hydrogen, chlorine, bromine or alkoxy of one to four carbon atoms, and
  $R_2$ is cyclohexyl or adamantyl-(1),
or an alkali metal salt thereof.

* * * * *

PO-1050
(5/69)

UNITED STATES PATENT OFFICE
CERTIFICATE OF CORRECTION

Patent No. 3,829,574   Dated  August 13, 1974

Inventor(s) EBERHARD KUTTER, GERHART GRISS, WOLFGANG GRELL, MANFRED KLEEMANN

It is certified that error appears in the above-identified patent and that said Letters Patent are hereby corrected as shown below:

Col. 5 line 17,    "14,4-  "           should read:

- -   -4,4-   - -

Col. 7 line 43,    that portion of the formula which now reads

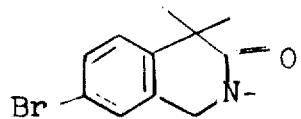

should read:

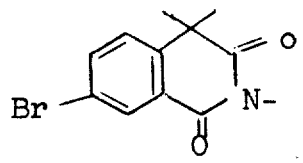

Col. 9 line 21,    " [p-('- cyclohexyl-  "     should read:

- - [p-(N'- cyclohexyl-   - -

Col. 9 line 31,    " - (1-ureido  "            should read:

- -  -(1)-ureido  - -

Col. 11 line 31,   "the moist was forced       should read:

- - the moist mass was forced - -

Signed and sealed this 12th day of November 1974.

(SEAL)
Attest:

McCOY M. GIBSON JR.              C. MARSHALL DANN
Attesting Officer                Commissioner of Patents